United States Patent
Champion et al.

(10) Patent No.: US 7,953,442 B2
(45) Date of Patent: *May 31, 2011

(54) METHOD AND SYSTEM FOR PROCESSING WIRELESS DIGITAL MULTIMEDIA

(75) Inventors: Mark Champion, Kenmore, WA (US); Robert Allan Unger, El Cajon, CA (US); Robert Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,281

(22) Filed: Feb. 3, 2010

(65) Prior Publication Data

US 2010/0134696 A1 Jun. 3, 2010

Related U.S. Application Data

(60) Division of application No. 12/142,051, filed on Jun. 19, 2008, now Pat. No. 7,684,826, which is a continuation of application No. 11/649,086, filed on Jan. 3, 2007, now Pat. No. 7,483,717, which is a continuation of application No. 11/215,463, filed on Aug. 30, 2005, now Pat. No. 7,228,154.

(60) Provisional application No. 60/624,940, filed on Nov. 3, 2004.

(51) Int. Cl.
*H04B 1/38* (2006.01)

(52) U.S. Cl. ......... 455/557; 455/566; 455/3.06; 455/74; 375/206

(58) Field of Classification Search .................. 455/557, 455/566, 3.06, 74; 375/206, 355
See application file for complete search history.

(56) References Cited

U.S. PATENT DOCUMENTS

| | | | | |
|---|---|---|---|---|
| 5,164,980 A * | 11/1992 | Bush et al. | ................. | 348/14.13 |
| 6,075,827 A * | 6/2000 | Shida et al. | ................... | 375/331 |
| 6,185,265 B1 * | 2/2001 | Campanella | ................... | 375/341 |
| 6,269,107 B1 * | 7/2001 | Jong | ............................ | 370/535 |
| 6,351,538 B1 * | 2/2002 | Uz | ................................ | 380/201 |
| 6,722,569 B2 * | 4/2004 | Ehrhart et al. | ................ | 235/469 |
| 7,228,154 B2 * | 6/2007 | Champion et al. | ............ | 455/557 |
| 7,295,578 B1 * | 11/2007 | Lyle et al. | ..................... | 370/503 |
| 7,477,326 B2 * | 1/2009 | Jaffe | ............................ | 348/726 |
| 7,483,717 B2 * | 1/2009 | Champion et al. | ............ | 455/557 |
| 7,684,826 B2 * | 3/2010 | Champion et al. | ............ | 455/557 |
| 2005/0027893 A1 * | 2/2005 | Jung et al. | ......................... | 710/1 |
| 2005/0047447 A1 * | 3/2005 | Satoh et al. | ................... | 370/535 |
| 2005/0151427 A1 * | 7/2005 | Chiou | ............................ | 307/43 |
| 2005/0280742 A1 * | 12/2005 | Jaffe | ............................ | 348/726 |
| 2005/0289631 A1 * | 12/2005 | Shoemake | .................... | 725/118 |
| 2006/0095638 A1 * | 5/2006 | Unger | ............................ | 710/310 |
| 2006/0158568 A1 * | 7/2006 | Kaylani et al. | ................ | 348/725 |

* cited by examiner

*Primary Examiner* — Minh D Dao

(74) *Attorney, Agent, or Firm* — John L. Rogitz

(57) ABSTRACT

A transmit digital processing system for wireless transmission of HDMI and/or DVI data using an FPGA. The FPGA converts the data into two data streams and includes a front end component multiplexing video data with control data. A complementary receive FPGA is also disclosed.

9 Claims, 6 Drawing Sheets

METHOD AND SYSTEM FOR PROCESSING WIRELESS DIGITAL MULTIMEDIA

This application is a divisional of U.S. patent application Ser. No. 12/142,051, filed Jun. 19, 2008, now U.S. Pat. No. 7,684,826 which is a continuation of U.S. patent application Ser. No. 11/649,086, filed Jan. 3, 2007, now U.S. Pat. No. 7,483,717, which is a continuation of U.S. patent application Ser. No. 11/215,463, filed Aug. 30, 2005, now U.S. Pat. No. 7,228,154, which claims priority to U.S. provisional patent application Ser. No. 60/624,940, filed Nov. 3, 2004. Priority to all of the above is claimed.

I. FIELD OF THE INVENTION

The present invention relates generally to wireless multimedia presentation systems.

II. BACKGROUND OF THE INVENTION

Digital video can be transmitted from a source, such as a DVD player, video receiver, ATSC tuner, or other computer, to a display, such as a flat panel video monitor, using a protocol known as Digital Visual Interface (DVI). Having been developed primarily for computers, DVI does not envision processing audio data.

Accordingly, to extend communication protocols to digital multimedia that includes audio for the purpose of, e.g., playing digital movies and the like, a protocol referred to as High Definition Multimedia Interface (HDMI) has been developed. HDMI is similar to DVI except it envisions the use of audio as well as video data and it adds television-related resolutions. Both DVI and HDMI are intended for wired transmission, and HDMI further permits the encryption of digital multimedia using an encryption method known as High-Bandwidth Digital Content Protection (HDCP). DVI also supports HDCP as an optional characteristic.

As recognized herein, to save table space and to increase people's mobility and viewing lines in the room, it may be desirable to view the multimedia on a display using a minimum of wiring. For instance, it may be desirable to mount a projector on the ceiling or to mount a plasma display or liquid crystal high definition (HD) television display on a wall, out of the way and capable of receiving multimedia data for display without the need for wires, since as understood herein among other things data transmission lines often do not exist in ceilings or walls.

The present invention further understands, however, that not just any wireless transmission system will do. Specifically, if a wireless link such as IEEE 802.11(b) is used that has a bandwidth which is insufficient to carry either compressed or uncompressed multimedia such as uncompressed high definition (HD) video, compressed multimedia standard definition (SD) video would have to be transmitted, requiring a relatively expensive decompression module at the projector. Some links such as IEEE 802.11(a) do have a bandwidth high enough to carry compressed HD video but not uncompressed SD or HD video. Also, in the case of 802.11(a) copyright protection may be implicated because the link is sufficiently long range (extending beyond the room in which it originates) that it can be detected beyond the immediate location of the transmitting laptop. With this in mind, the present invention recognizes the need for a very short range, preferably directional, high bandwidth wireless link that is particularly suited for the short range wireless communication of uncompressed multimedia, particularly the rather voluminous genre of multimedia known as HD video.

The present assignee has provided a wireless system that functions in the spectrum between 57 GHz and 64 GHz (hereinafter "60 GHz band"). Characteristics of the 60 GHz spectrum include short range, high directivity (and, hence, inherent security), and large data bandwidth. The present assignee's co-pending U.S. patent application Ser. Nos. 10/666,724, 10/744,903 (systems), 10/893,819, 11/136,199 (PLL-related inventions), and 11/035,845 (multiple antennae), all of which are incorporated herein by reference, disclose various systems and methods for sending high definition (HD) video in High Definition Multimedia Interface (HDMI) format from a source in a room to a receiver in the room, using a high bandwidth 60 GHz link. At this frequency the signal has very short range and can be directional such that the video may be transmitted in an uncompressed form such that so much data is transmitted each second that bootlegging the content is essentially untenable.

Regardless of the particular application, the present invention makes the following critical observation about 60 GHz wireless links. As understood herein, simpler, non-audio DVI components are less expensive than HDMI components which add the feature of audio and, hence, would be desirable to use when feasible in lieu of HDMI components. Unfortunately, an HDMI transmitter will never send HDMI data to a DVI receiver once the transmitter discovers that the receiver is not HDMI, so it can be difficult to mix the two systems. Nonetheless, the present invention understands that it is possible to selectively use less expensive DVI components in an HDMI system.

SUMMARY OF THE INVENTION

A system for wirelessly transmitting HDMI data from a source to a display includes a DVI receiver receiving HDMI data, and a transmit digital processing system receiving an output of the DVI receiver. A wireless transmitter receives an output of the transmit digital processing system and wirelessly sends it to a receiver, where a receive digital processing system receives an output of the receiver and sends it to a DVI transmitter. A display receives the output of the DVI transmitter and displays, in response, the HDMI data, including audio data present in the HDMI data.

In another aspect, a transmit digital processing system for wireless transmission of HDMI and/or DVI data is disclosed. The system converts the data into two data streams and includes a front end component multiplexing video data with control data.

In non-limiting implementations of the transmit digital processing system, a forward error correcting component such as, e.g., a Reed-Solomon encoder receives an output of the front end component, which outputs a substantially continuous stream of data to the Reed-Solomon Encoder. If a video data rate to the front end component is insufficient to satisfy the RS Encoder, null words are generated by the front end component such that the RS Encoder is never starved for data. The front end component can combine four 25-bit values to form a single 100-bit word and then convert the 100-bit word into five 20-bit words.

Additionally, in some embodiments a scrambler receives data from the forward error correcting component and randomizes the data. Also, a header generator can be provided for periodically outputting a header, a first portion of which includes preset data useful for synchronizing a receiver and a second portion of which includes variable data including control information useful by the receiver. Each header is associated with a unit of multimedia data from the scrambler.

Furthermore, if desired a differential encoder can be used to represent absolute data from the header generator as phase shifted quadrature data.

In preferred but non-limiting embodiments the transmit processing system is implemented by an FPGA configured for preparing the HDMI and/or DVI data for wireless transmission in the 60 GHz band.

In another aspect, a receive digital processing system for wireless reception of HDMI and/or DVI data deserializes received data using a deserializer which aligns data by using a first character of a received header to perform alignment in both I and Q channels.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
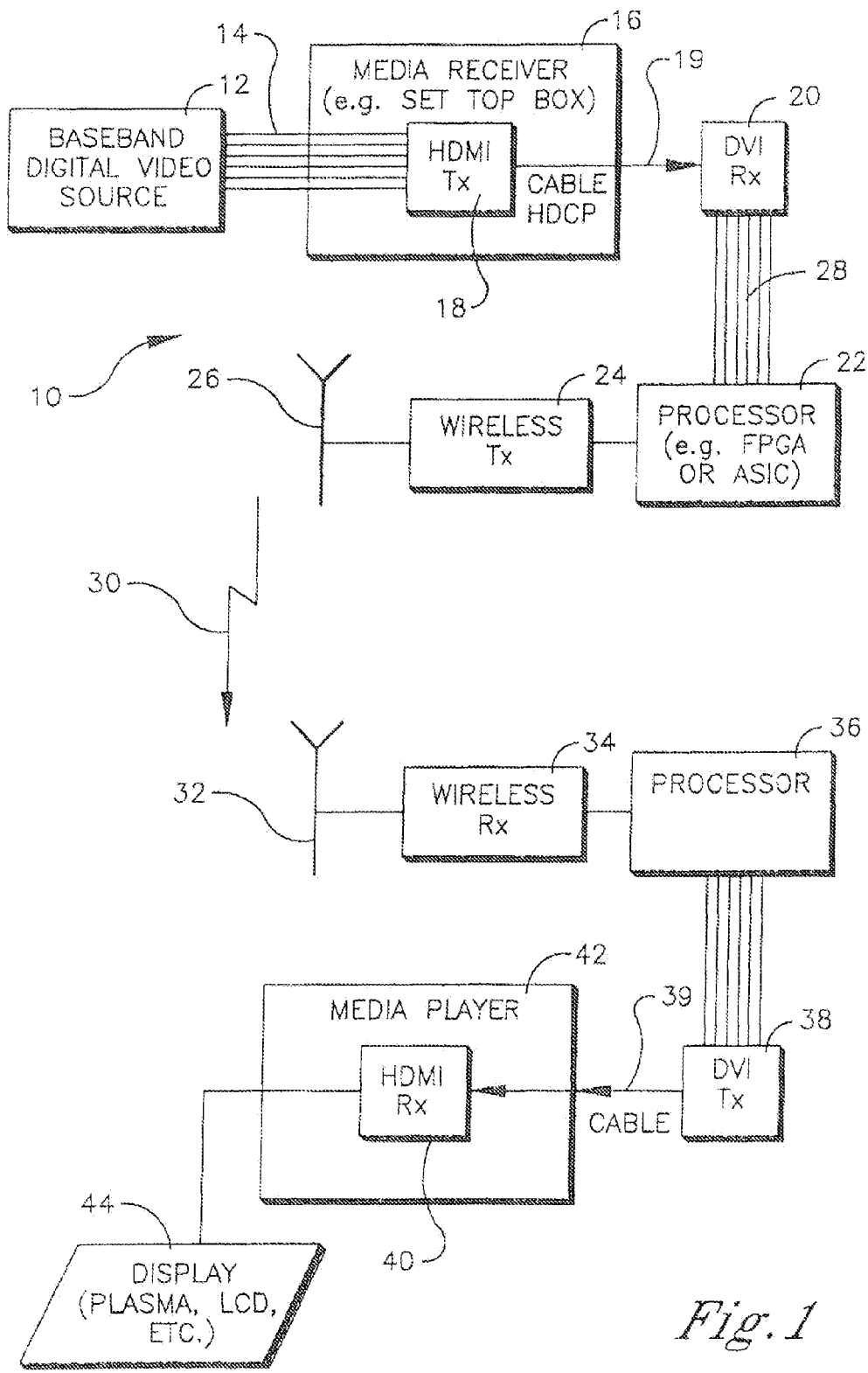
FIG. 1 is a block diagram showing the present system.

Referring initially to FIG. 1, a system is shown, generally designated 10, which includes a source 12 of baseband multimedia data, and in particular high definition (HD) digital video with audio. The source 12 may be a laptop computer or other multimedia computer or server. Or, it can be a satellite, broadcast, or cable receiver, or it can be a DVD player or other multimedia source.

The source 12 sends multiplexed multimedia data over lines 14 to a media receiver 16, so that the source 12 and media receiver 16 together may be thought of as a "source" of data and specifically of HDMI data. The media receiver 16 may be a set-top box that can include a High Definition Multimedia Interface (HDMI) transmitter 18. The HDMI transmitter 18 employs HDMI protocols to process the multimedia data by, among other things, encrypting the data using High-Bandwidth Digital Content Protection (HDCP) and supporting TV resolutions such as 16×9 display ratios to the multimedia data.

In accordance with HDMI principles known in the art, the HDMI transmitter 18 sends HDCP-encrypted multimedia data over a cable or other wire 19 to a Digital Visual Interface (DVI) receiver 20. According to the present invention, the DVI receiver 20 uses DVI protocols to process the received data. As part of the processing the HDMI transmitter 18 multiplexes the video and multiplexes the audio within the video data stream. The DVI receiver 20 demultiplexes the video while passing through the audio multiplexed within the data stream. In any case, at no time need the DVI receiver 20 decrypt or re-encrypt the stream.

The encrypted multimedia data from the VBI receiver 20 is sent to a processor 22, such as an application specific integrated circuit (ASIC) or field programmable gate array (FPGA) or other microprocessor. The processor 22 processes the data for wireless transmission by a wireless transmitter 24 over a transmitting antenna 26. The processor 22 is described further below.

The encrypted multimedia data is wirelessly transmitted over a wireless link 30 to a receiver antenna 32, which sends the data to a wireless receiver 34. Multimedia may be transmitted in an uncompressed form on the link 30 such that so much data is transmitted each second that bootlegging the content is essentially untenable, although some data compression less preferably may be implemented. The data may also be transmitted in compressed form if desired. The transmitter 24 and receiver 34 (and, hence, link 30) preferably operate at a fixed (unvarying, single-only) frequency of approximately sixty GigaHertz (60 GHz), and more preferably in the range of 59 GHz-64 GHz, and the link 30 may have a data rate, preferably fixed, of at least two Giga bits per second (2.0 Gbps). When DQPSK is used the data rate may be 2.2 Gbps, and the link may have a data rate of approximately 2.5 Gbps. The link may have a fixed bandwidth of two and half GigaHertz (2.5 GHz).

With this in mind, it may now be appreciated that the wireless transmitter 24 preferably includes an encoder for encoding in accordance with principles known in the art. The encoded data is modulated and upconverted by an upconverter for transmission over the link 30 at about 60 GHz (i.e., in the 60 GHz band). Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved.

It may further be appreciated that the wireless receiver 34 includes circuitry that is complementary to the wireless transmitter 24, namely, a downconverter, a demodulator, and a decoder. In any case, the data from the wireless receiver 34 is sent to a processor 36 for error correction and re-multiplexing as appropriate for use by a DVI transmitter 38. The processor 36 can also demultiplex any control signals for the display from within the video data as might be necessary. The DVI transmitter 38 operates in accordance with DVI principles known in the art to process the encrypted multimedia without ever decrypting it, and to send the multimedia data over a cable or other wire 39 to a HDMI receiver 40 that may be part of a media player 42, such as a DVD player or TV or other player. The HDMI receiver 40 decrypts the multimedia data in accordance with HDCP principles and demultiplexes the audio data from the video data. The multimedia content may then be displayed on a display 44, such as a cathode ray tube (CRT), liquid crystal display (LCD), plasma display panel (PDP), or TFT, or projector with screen, etc. Together, the media player 42 and display 44 may be thought of as a video display, an HDMI sink, or other unit.

The link described above is preferably bi-directional, and return channel information that is necessary for, e.g., HDCP decryption purposes may be sent on a return link in the 60 GHz band or it may be sent on a return link "out of band" as disclosed in, e.g., the present assignee's co-pending U.S. patent application Ser. Nos. 11/036,932 and 11/035,845, incorporated herein by reference.

According to the present invention, the DVI receiver 20, processor 22, and wireless transmitter 24 may be contained on a single chip, or on separate substrates. Indeed, the DVI receiver 20, processor 22, and wireless transmitter 24 may be integrated into the media receiver 16. Likewise, the wireless receiver 34, processor 36, and DVI transmitter 38 may be implemented on a single chip and may be integrated into the media player 42 if desired. In any case, the media receiver 16 and media player 42 and respective components preferably are co-located in the same space, owing to the preferred 60 GHz wireless transmission frequency, which cannot penetrate walls.

Because DVI components are used in the wireless connection of the communication path between the media receiver 16 (e.g., a set-top box) and the media player 42 (e.g., a TV or DVD player), no encryption keys (or concomitant licenses) are required for this link. Also, because the multimedia is never decrypted in the wireless connection established between the DVI components 20, 38 inclusive, little or no licensing concerns are implicated. Furthermore, owing to the above-described use of DVI components, any HDMI compliant display 44 that is connected to the source 12 via the wireless link, along with the source 12, behave as though they are connected by wires, because the system is capable of accurately reproducing all HDMI output signals including a frequency-accurate copy of the video clock. Specifically, use of a DVI receiver 20 in the transmitter portion to drive the DVI transmitter 38 in the receiver portion results in the HDMI display 44 interpreting the resulting data stream correctly, including any audio data that might be delivered in so-called "data islands".

Figure 2:
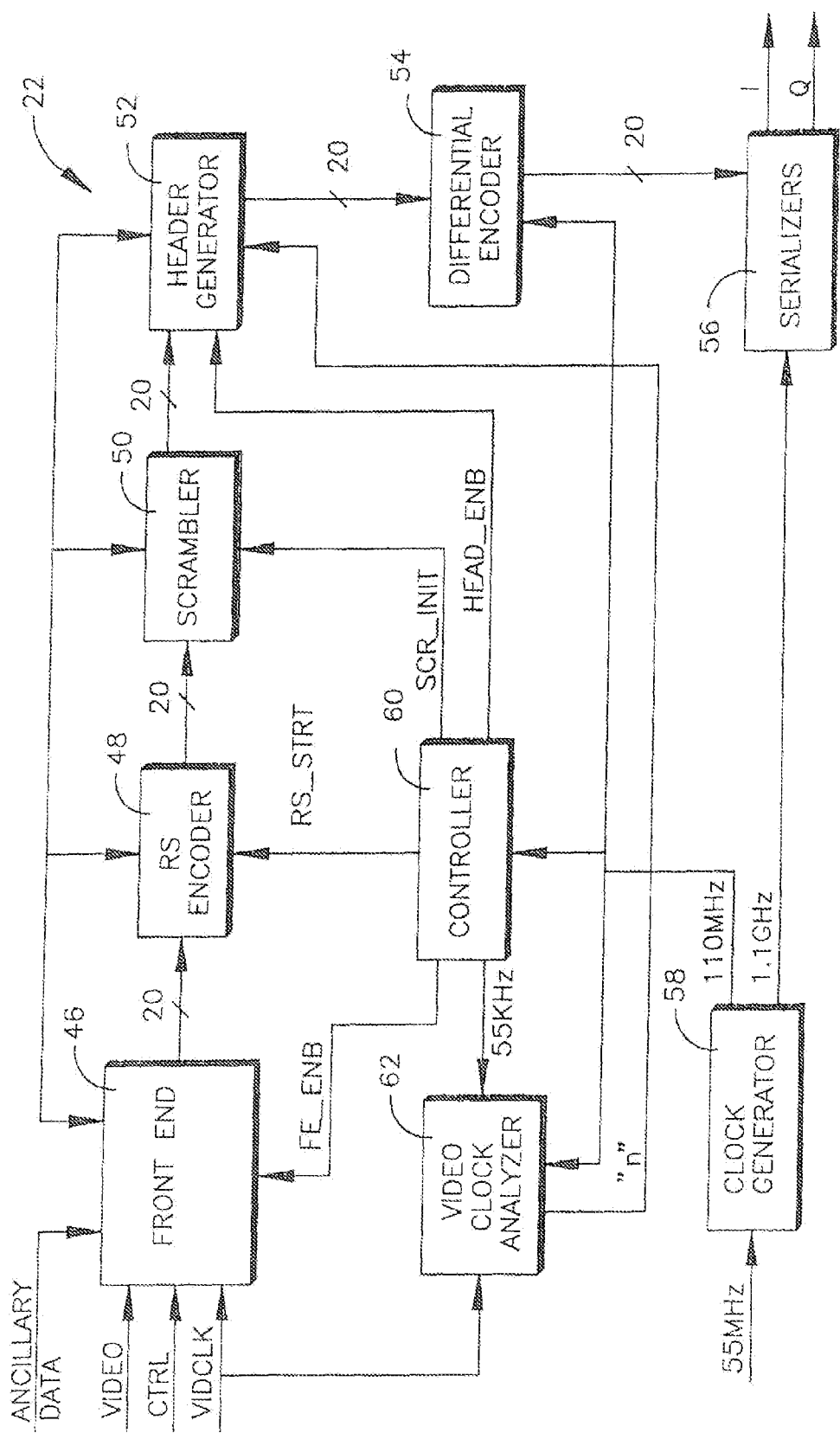
FIG. 2 is a block diagram of an exemplary transmit processor.

Turning to FIG. 2 and a non-limiting FPGA implementation of the transmit processor 22 (accordingly referred to in the non-limiting disclosure below as a "Transmit FPGA"), one exemplary non-limiting Transmit FPGA converts 24-bit video data into two 1.1 Gbps data streams. It does this in a series of steps. First, a Front End 46 multiplexes 24-bit video data with 5-bit control data (HS, VS and Control[3:1]) and optional ancillary, data. The Front End 46 outputs a near continuous stream of 20-bit data at, e.g., 110 MHz to a Reed-Solomon (RS) Encoder 48. If the incoming video data rate is insufficient to satisfy the RS Encoder, null words are generated such that the RS Encoder is never starved for data.

The RS Encoder 48 may include two 10-bit encoders that apply an RS code of (216, 200). The RS Encoders each accept two hundred 10-bit words of data and add sixteen words of forward error correction (FEC) data. This coding scheme enables the receiver to correct up to eight errors in each RS block of 216 words. As understood herein, forward error correction such as Reed-Solomon is advantageous to correct occasional transmission errors that can be present in wireless transmission systems, which if left uncorrected could temporarily disrupt the displayed image or produce video artifacts.

Data is sent from the RS encoder 48 to a Scrambler 50, which randomizes the data. The Scrambler 50 is not used for any encryption purpose, which is effected by the higher-level protocol HDCP mentioned above. Instead, the Scrambler 50 randomizes the data to ensure that frequent transitions occur in the data stream, which advantageously allow the receiver to better synchronize itself to the bit clock and recover the data. The Scrambler 50 can use a pseudo-random number (PRN) generator to create a twenty-bit random number for each twenty-bit word, with the incoming word being exclusive-OR'ed with the random number to produce a scrambled output. An identical PRN generator is used in the receiver to unscramble the data, and both PRN generators may be initialized every 20 uS.

Data from the scrambler 50 is sent to a Header Generator 52 which periodically (e.g., every twenty microseconds) outputs a header of, e.g., forty words. The first twenty words of this header may be preset data, which is used to synchronize the receiver. This is followed by twenty words of variable data, which can include control information that may be used by the receiver. Following the forty header words, the Header Generator 52 can pass ten scrambled RS blocks of data (2160 words) on to a Differential Encoder 54, and then repeat the process.

The Differential Encoder 54 accepts the twenty-bit data as a pair of ten-bit words. The encoder 54 evaluates each word pair as ten 2-bit entities, starting with the most significant bits.

Each 2-bit value is compared to the previous 2-bit value. The difference may be represented using Gray code and output to I and Q stream Serializers 56. The purpose is to represent the absolute data as phase shifted quadrature data as it exits the Serializers 56 and enters the wireless transmitter 24 shown in FIG. 1, e.g., a QPSK modulator. The Serializers 56 may include two special purpose FPGA cells that, in one non-limiting implementation, may be Xilinx "RocketIO" cells that are ten-bit serializers which accept the differentially encoded data in parallel and shift it out a bit at a time to the I/Q outputs.

FIG. 2 also shows a Clock Generator 58, which synthesizes a clock (such as a 1.1 GHz clock) used by the Serializers 56 and a, e.g., 110 MHz clock for shifting the parallel data though the system. 1.1 GHz can be used because the RF modulator and demodulators may be tuned to operate at this specific bit rate. 110 MHz may be used because it is exactly one-tenth of the 1.1 GHz bitrate.

A Controller 60 is provided to synchronize all components of the non-limiting Transmit FPGA 22 shown in FIG. 2. It tells the Header Generator 52 when to generate the forty-word header and initializes the PRN generator in the Scrambler 50. The Controller 60 also starts the RS Encoder 48 such that its output will be present at the proper time, and the Controller 60 informs the Front End 46 when data must be available to the RS Encoder 48. The Controller 60 can use a 2200 state counter, with the 2200 states being defined by the ten 216-word RS blocks (2160 states) and forty header words.

The Controller 60 may output a clock to a Video Clock Analyzer 62 with each pass through the 2200 state counter (i.e. every 20 uS). The Video Clock Analyzer (VCA) 62 counts the number of video clocks during the 2200 states of the Controller 60 (20 uS). The resulting count "n" is transmitted to the receiver as part of the header's variable data "n" that is used in the receiver to regenerate the video clock in accordance with the above-incorporated applications divulging PLL-related inventions.

Figure 3:
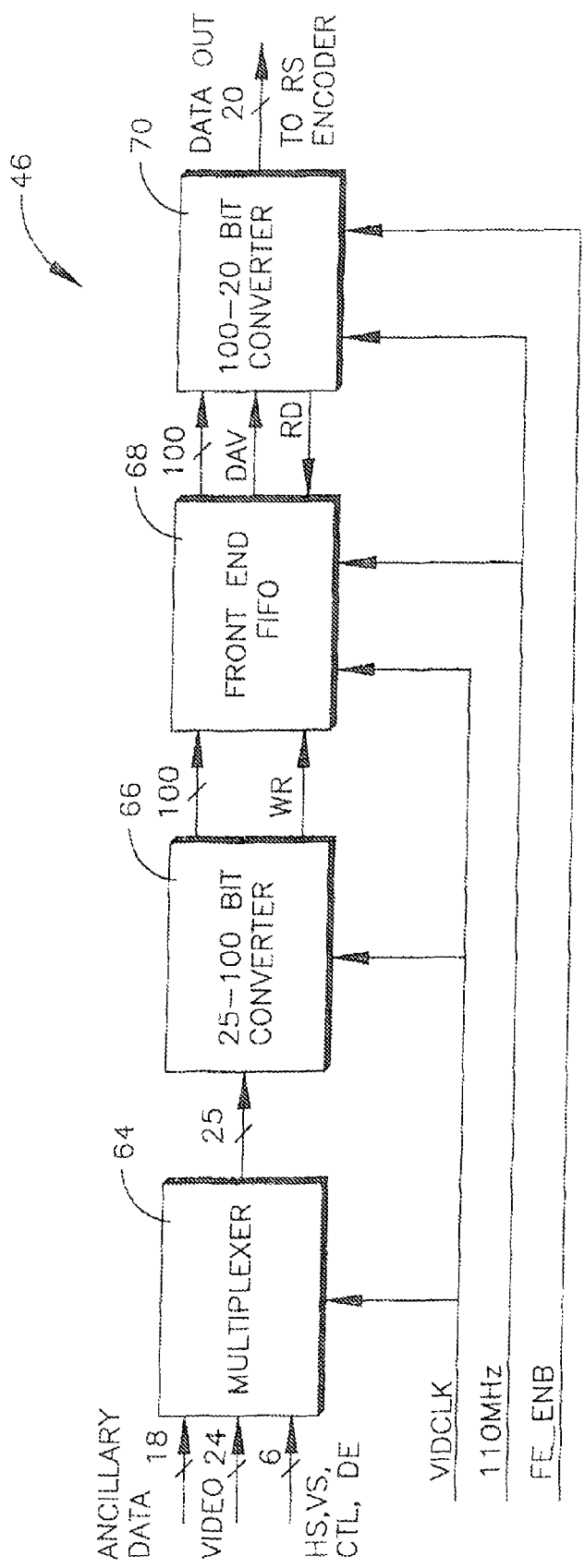
FIG. 3 is a block diagram of an exemplary transmit processor front end.

Turning to FIG. 3, the Front End 46 of the Transmit FPGA 22 is responsible for multiplexing video data into a twenty-bit data stream. The primary issues associated with this task are as follows:

1. Both video and control data (HS, VS, etc.) must be multiplexed together with some means of separation at the receiver.
2. The video clock rate is unrelated to the local 110 MHz clock. Some mechanism must allow the video data to move from the video clock domain to the 110 MHz clock domain.
3. The Front End must provide a continuous stream of data out whenever FE_ENB is asserted. If valid video/control data is not available, null data must be generated and inserted.

The Front End 46 may be partitioned into four blocks as shown. Video/control data enters a Front End Multiplexer 64 at the rate of one video pixel or one control word for every video clock. A separate control line "DE" indicates whether the incoming data is a pixel (DE=1) or a control word (DE=0). For each video clock, the Multiplexer 64 outputs a 25-bit word with DE as the most significant bit. When DE=1, the remaining 24 bits are the video pixel. When DE=O, the remaining 24 bits include a fixed "1" as bit [23], five control lines (HS, VS, Control [3:1]) and room for eighteen bits of ancillary data. Ancillary data could be any additional data that may be useful at the receiver. For example, ancillary data can include commands to increase/decrease display brightness.

The Multiplexer 64 thus outputs only video pixel data and control data. Null fill data is generated in a 100-to-20 bit Converter 66. As understood herein, eventually, the 25-bit output of the Multiplexer 64 must be converted to 20-bit values. This conversion is performed in two steps. First, four 25-bit values are combined to form a single 100-bit word by the Converter 66. When four 25-bit words have been assembled into a 100-bit word, they are immediately written into a Front End FIFO 68. The FIFO 68 is capable of holding fifteen 100-bit words. The FIFO 68 notifies a 100-to-20 bit converter 70 when data is available with its DAV output. The FIFO is written synchronously with the video clock and read synchronously with the 110 MHz clock.

When FE_ENB is asserted, the 100-to-20 bit Converter 70 removes words from the FIFO and outputs them in bursts of five 20-bit words. Once a 100-bit word is removed from the FIFO, the entire word is output as five 20-bit words in five consecutive clock cycles. If FE_ENB is requesting data and the FIFO does not have data available (i.e. DAV=0), the 100-to-20 bit Converter 70 generates five words of null fill (all zeros). At lower pixel clock rates, this can happen frequently to keep the data pipe full. Accordingly, at the output of the non-limiting Front End 46, data is always packed in groups of five 20-bit words, to allow the receiver to reliably extract the video and control data without the need for any additional flags or identifiers embedded in the data stream.

Figure 4:
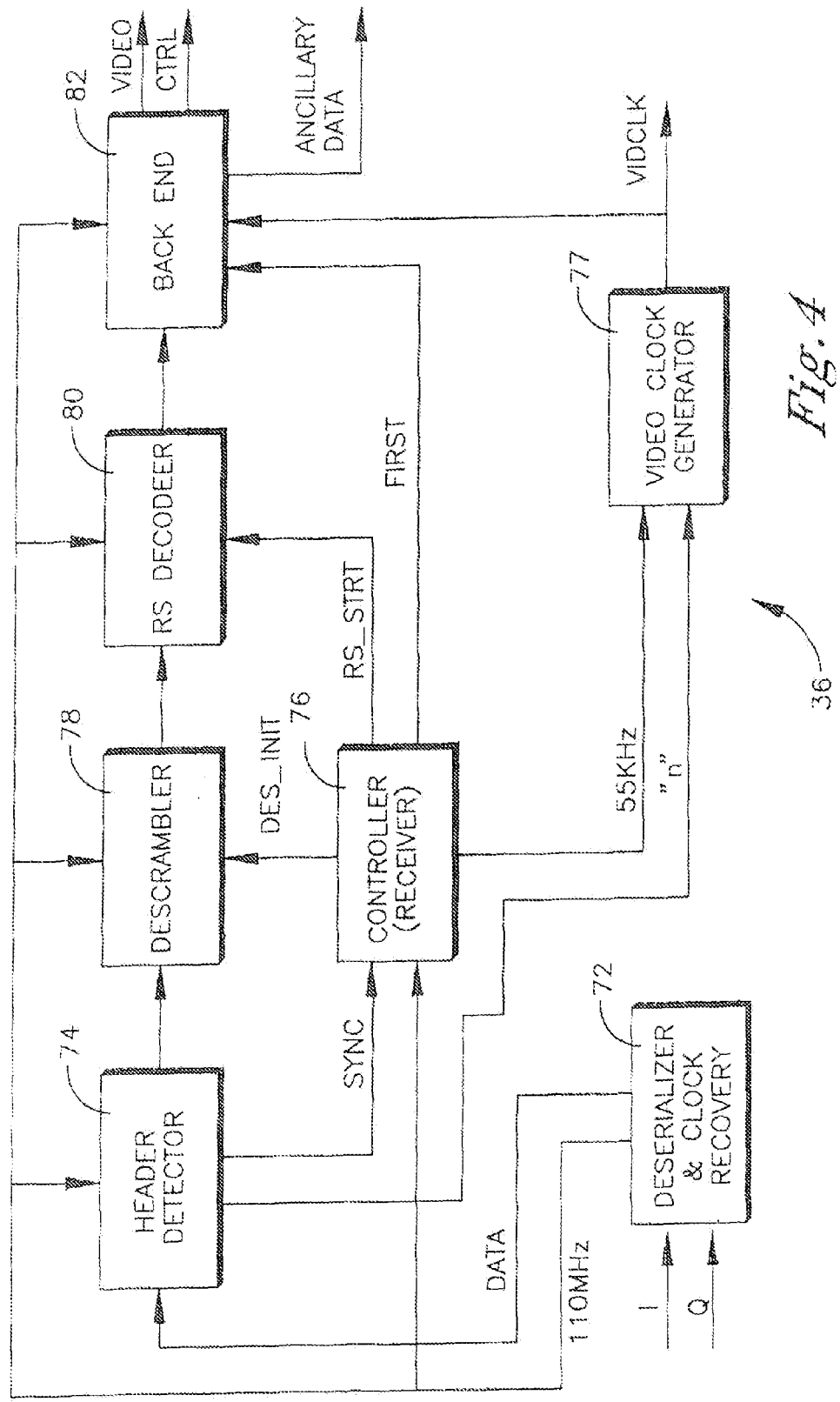
FIG. 4 is a block diagram of an exemplary receive processor.

FIG. 4 shows a non-limiting implementation of the receive processor 36, referred to herein as a "Receive FPGA". The receive FPGA accepts the I and Q data streams, processes the data and outputs 24-bit video. This is done in several stages as shown in FIG. 4.

More specifically, incoming I and Q data stream are processed to recover the clock and data by a non-limiting FPGA RocketIO cell with clock/data recovery capability, denoted in the block diagram as a "deserializer" 72. The deserializer 72 recovers clock/data automatically to extract the original 1.1 GHz transmit clock and to divide it down to 110 MHz for use in moving parallel data through the system.

When deserializing data, the deserializer 72 determines where one word ends and the next begins within the serial data stream. This process is referred to as alignment. The deserializer 72 uses the first character of the header to perform this alignment operation in both the I and Q channels.

Following alignment, the deserializer 72 performs a "bonding" operation in which the parallel I and Q data are aligned relative to each other. If, for example, the parallel I data leads or lags the parallel Q data by one or more clocks, data is skewed and processing cannot continue. To prevent this, the deserializer 72 performs the bonding operation by looking for a specific sequence of, e.g., four words occurring in both the I and Q headers. When they occur, the deserializer performs any time shifting that might be necessary to bring the I and Q channels into relative alignment with each other.

Following bonding, a Header Detector 74 searches for the twenty word header that was inserted at the transmitter as disclosed above. When the header is found, the Header Detector 74 signals a receiver controller 76 to synchronize itself with the data stream. Once synchronized, the controller 76 can synchronize the other processing blocks in the receiver FPGA. The Header Detector 74 also removes the special "n" value from the variable portion of the header and sends it to a video clock generator 77 for clock recovery in accordance with the above-incorporated applications directed to PLL inventions.

The remaining processing blocks in the non-limiting receiver FPGA 36 shown in FIG. 4 are complementary to those in the transmitter FPGA shown in FIG. 2. With more specificity, a descrambler 78 contains a PRN generator that is initialized by the controller 76 at the proper time such that the data following the header is restored to its pre-scrambled values. Also, a Reed-Solomon Decoder 80 can include two 10-bit decoders, each capable of correcting a total of up to eight erroneous words in the 216-word RS data block. As each RS data block is decoded, the number of errors encountered may be monitored by a peak error detector if desired. Every 100 mS, the worst error count may be displayed on an LED bar graph and the peak error detector is reset to provide feedback to the user in adjusting the antenna for optimal operation.

Figure 5:
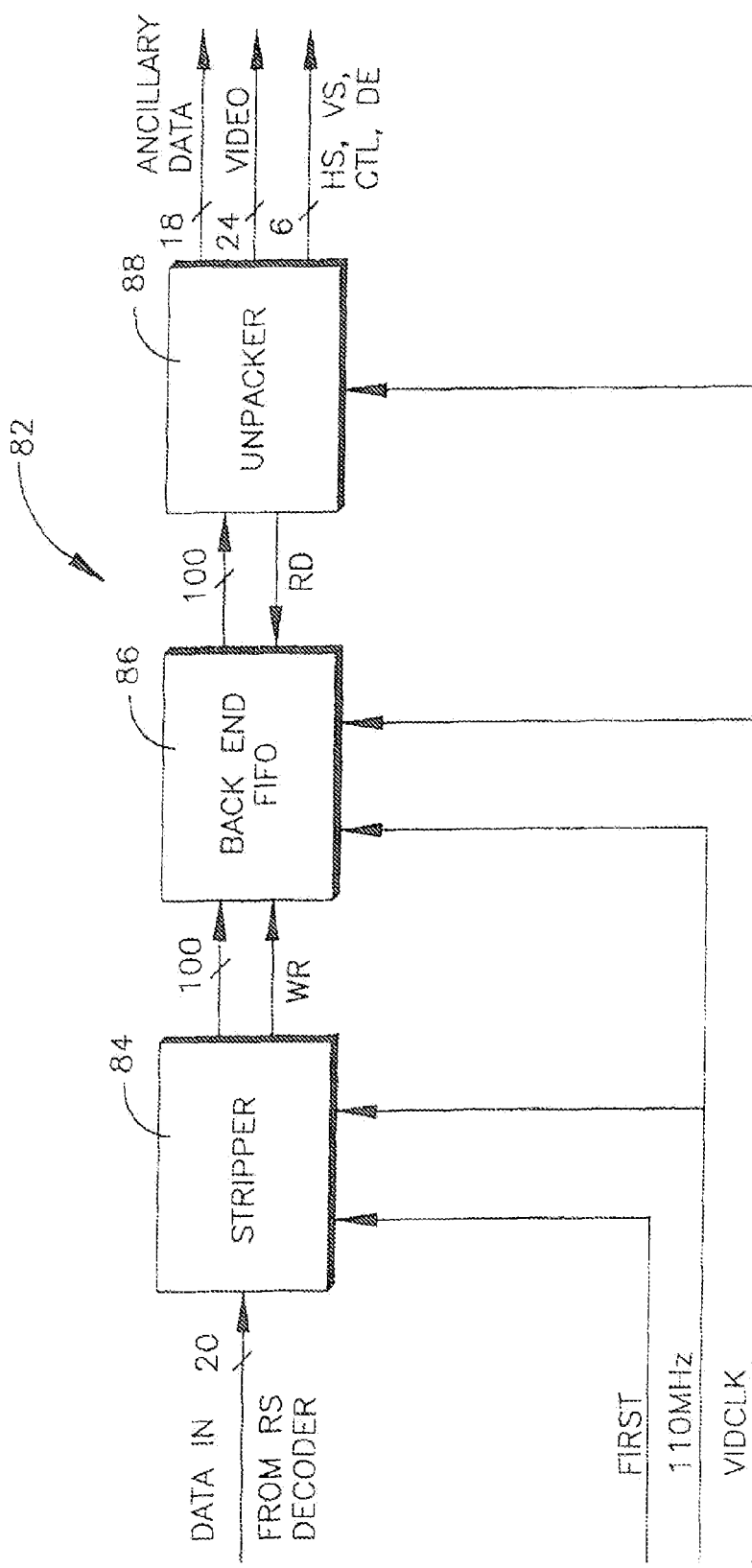
FIG. 5 is a block diagram of an exemplary receive processor back end.

Following the RS Decoder 80, the corrected 20-bit data stream is sent to the Receiver's Back End 82 for final processing and demultiplexing. FIG. 5 shows details of the Back End 80, which is complementary to the transmitter Front End 46 and which is responsible for taking the 20-bit data stream and extracting the original video and control data. This video and control data is then output to the DVI transmitter 38 shown in FIG. 1.

The Back End 82 receives bursts of data in which null data must be identified and discarded, with the remaining data being demultiplexed into video and control words and with the incoming and output data using completely unrelated clocks. Accordingly, the non-limiting Back End 82 may include a Stripper 84 which receives data from the RS Decoder 80. The Controller 76 identifies every fifth word as the first word of a five word group. In each five-word group, the first word is examined, and if it is a null word, it is discarded along with the next four by the stripper 84. In contrast, if the first word is not a null word, the five word group is assembled into a 100-bit word by the stripper 84 and written to a Back End FIFO 86.

Data from the FIFO 86 is sent to an unpacker 88 which takes data from the Back End FIFO in 100-bit words and separates each 100-bit word into four 25-bit words. If the most significant bit is a one, the remaining 24 bits are output as video data (i.e. a pixel), but if the most significant bit is a zero, the remaining 24 bits are output as control data and ancillary data.

As previously discussed, the Reed-Solomon code that may be used in a non-limiting implementation is (216,200). As recognized herein, when selecting an RS code, the transmission channel should be characterized first and the RS code then selected to achieve a desired Bit Error Rate (BER). The characteristics of the transmission channel can be a function of the particular installation. The distance between receiver and transmitter is one variable but other variables exist. For example, multi-path distortion will affect BER and is a strong function of the environment. There are other factors that impact the decision of which RS code it best, including, for example, the amount of FPGA fabric (flip-flops) required to implement the code and the requirement for real-time operation.

The (216,200) code could be shortened to (108,100) or even (54,50) to maintain the existing redundancy while reducing the amount of FPGA fabric required. However, as understood herein a reduction in the ability to handle burst errors can accrue with the use of shorter codes. The (216,200) code is capable of correcting a burst of eight word errors (80 bit errors), whereas a (54,50) code can only correct a burst of two word errors (20 bit errors). An alternative approach to the handling of burst errors is the use of an interleaver. More specifically, an interleaver can be used to distribute burst errors over multiple RS blocks and thereby increase chances that all errors are corrected.

Figure 6:
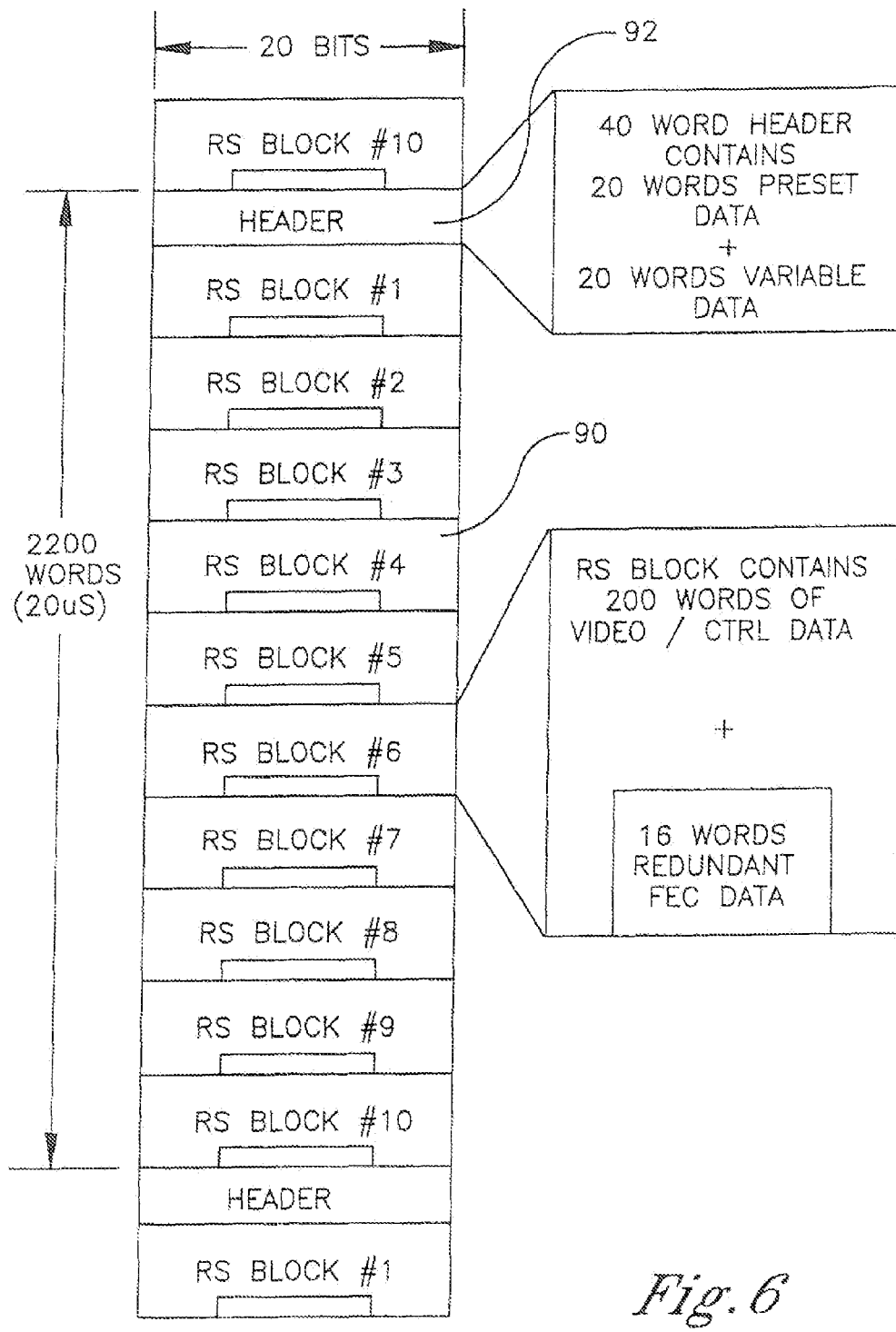
FIG. 6 is a schematic diagram of a data stream.

FIG. 6 shows the data stream produced by the transmitter processor 22. The non-limiting data format shown in FIG. 6 allows video data rates up to exactly 80 MHz when used at the symbol rate of 110 MHz. In a 20 uS data frame, 2200 20-bit symbols are sent in a series of blocks 90, with each block 90 containing its own header 92 and up to two hundred words of video/control data and if needed FEC data. The data frame shown in FIG. 6 thus contains up to 1600 video words (pixels or controls) which, at 80 MHz, represents exactly 20 uS of video data.

While the particular METHOD AND SYSTEM FOR PROCESSING WIRELESS DIGITAL MULTIMEDIA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A transmit digital processing system for wireless transmission of HDMI and/or DVI data, the system converting the data into two data streams, wherein the system includes a front end component multiplexing video data with control data, a forward error correcting component receiving data from the front end component, and a scrambler receiving data from the forward error correcting component and randomizing the data.

2. The system of claim 1, comprising a header generator periodically outputting a header, a first portion of which includes preset data useful for synchronizing a receiver, a second portion of which includes variable data including control information useful by the receiver, each header being associated with a unit of multimedia data from the scrambler.

3. The system of claim 1, wherein the front end component combines four 25-bit values to form a single 100-bit word and then converts the 100-bit word into five 20-bit words.

4. The system of claim 1, wherein the system is implemented by an FPGA configured for preparing the HDMI and/or DVI data for wireless transmission in the 60 GHz band.

5. A receive digital processing system for wireless reception of HDMI and/or DVI data, the system deserializing received data using a deserializer aligning data by using a first character of a received header to perform alignment in both I and Q channels.

6. The system of claim 5, wherein the deserializer bonds parallel I and Q data by aligning them relative to each other.

7. The system of claim 5, comprising a descrambler receiving data from the deserializer.

8. The system of claim 5, wherein the system is implemented by an FPGA configured for processing the HDMI and/or DVI data received from wireless transmission in the 60 GHz band.

9. The system of claim 5, in combination with a transmit digital processing system for wireless transmission of HDMI and/or DVI data, the transmit digital processing system converting the data into two data streams, wherein the system includes a front end component multiplexing video data with control data.

* * * * *